(12) United States Patent
Weatherl et al.

(10) Patent No.: US 6,755,363 B2
(45) Date of Patent: Jun. 29, 2004

(54) HIGH TORQUE DRIVELINE COUPLER

(75) Inventors: Bradley G. Weatherl, Deshler, NE (US); Darin J. Neff, Hebron, NE (US)

(73) Assignee: Reinke Manufacturing Co., Inc., Deshler, NE (US)

( * ) Notice: Subject to any disclaimer, the term of this patent is extended or adjusted under 35 U.S.C. 154(b) by 142 days.

(21) Appl. No.: 09/761,260

(22) Filed: Jan. 16, 2001

(65) Prior Publication Data

US 2001/0025894 A1 Oct. 4, 2001

Related U.S. Application Data

(60) Provisional application No. 60/176,405, filed on Jan. 13, 2000.

(51) Int. Cl.$^7$ ................................................. B05B 3/00
(52) U.S. Cl. ........................ 239/735; 239/743; 239/744; 464/151
(58) Field of Search ................................. 239/732, 735, 239/737, 741, 743, 744, 747; 464/87, 151, 23, 155, 106, 51

(56) References Cited

U.S. PATENT DOCUMENTS

| | | | |
|---|---|---|---|
| 1,135,967 A | * | 4/1915 | Douglas ...................... 464/151 |
| 1,232,540 A | | 7/1917 | Hartmann |
| 1,948,868 A | | 2/1934 | Peters |
| 2,004,299 A | | 6/1935 | Snyder |
| 2,234,296 A | | 3/1941 | Wollner |
| 2,293,717 A | | 8/1942 | Dodge |
| 2,462,700 A | | 2/1949 | Wingquist |
| 2,755,641 A | | 7/1956 | Dunn |
| 2,984,997 A | | 5/1961 | Wight |
| 3,321,935 A | | 5/1967 | Wildhaber |
| 3,342,041 A | | 9/1967 | Nebiker, Jr. |
| 3,623,662 A | * | 11/1971 | Reinke ....................... 239/731 |
| 4,193,740 A | | 3/1980 | Charles |
| 4,921,470 A | * | 5/1990 | Kotani et al. ............... 464/151 |

* cited by examiner

*Primary Examiner*—Christopher Kim
(74) *Attorney, Agent, or Firm*—Jeffrey L. Thompson; Thompson & Thompson, P.A.

(57) ABSTRACT

A high torque driveline coupler is provided for use in the driveline between a drive motor and a wheel drive of a sprinkler irrigation system. The coupler has first and second yoke assemblies with intermeshed pairs of legs, and a floating rubber member with radially extending arms positioned between the intermeshed legs of the yoke assemblies. The legs of the yoke assemblies and the floating rubber member are arranged to allow the coupler to be quickly and easily coupled and decoupled without the use of separate means for securing the yoke assemblies together. The coupler has a unique alignment system for aligning the floating member with the yoke assemblies. The alignment system includes first and second recesses formed in opposite sides of a center portion of the floating rubber member, and first and second projections extending from the first and second yoke assemblies, respectively. The first and second projections are shaped to fit snugly within the first and second recesses to keep the floating rubber member substantially aligned with the yoke assemblies. The alignment system increases the effective maximum torque capacity of the coupler.

21 Claims, 5 Drawing Sheets

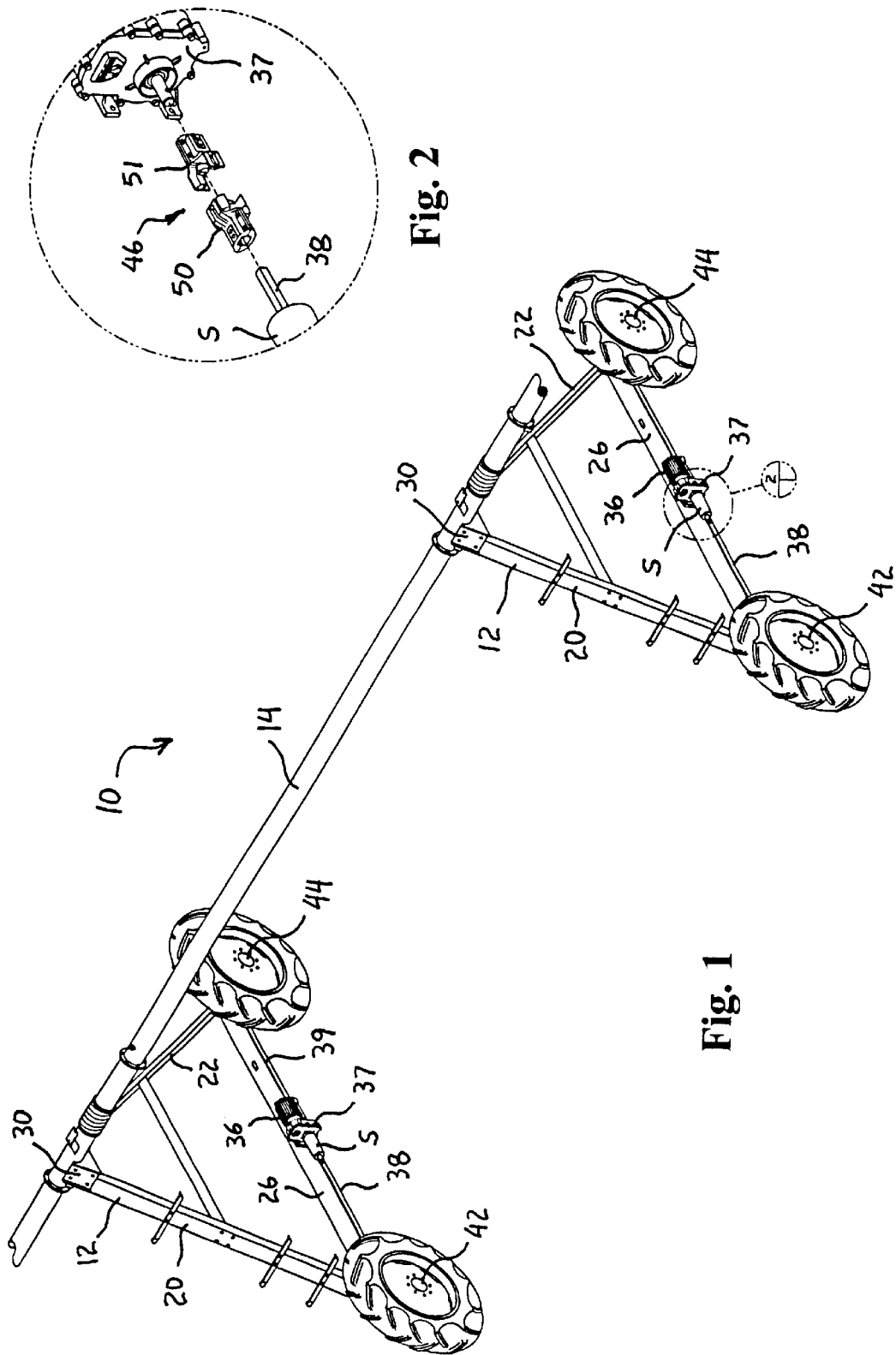

HIGH TORQUE DRIVELINE COUPLER

RELATED APPLICATIONS

This application claims the benefit of U.S. Provisional Application No. 60/176,405, filed on Jan. 13, 2000.

BACKGROUND OF THE INVENTION

1. Field of the Invention

The present invention relates generally to driveline coupler devices for connecting drive train components. In particular, the present invention relates to driveline couplers for connecting driveline components that operate under high torque conditions, such as the tower drivelines of sprinkler irrigation systems.

2. Description of the Related Art

Sprinkler irrigation systems are widely used throughout the world to provide water for agricultural purposes in arid regions. Typically, such systems include a series of spaced support towers connected by truss sections that support an elevated water distribution pipe between the towers. In center pivot systems, the water distribution pipe extends radially from a central pivot communicating with a pressurized water supply. In linear move irrigation systems, the water distribution pipe extends laterally from a canal feed or hose drag system that provides a pressurized water supply.

Water passing through the distribution pipe is forced out through a number of sprinkler heads, spray guns, drop nozzles, and the like, spaced along the length of the pipe. Each tower in the system is supported on wheels that are driven at slow speeds to move the tower in a circular path about the central pivot, or a linear path in the case of linear move systems, to thereby irrigate a large tract of land.

A number of drive assemblies have been developed for driving the support wheels of sprinkler irrigation systems. The most common drive assembly includes an electric motor connected to a center gear drive assembly, a first wheel gear assembly coupled to the center gear drive assembly by a first drive shaft, and a second wheel gear assembly coupled to an opposite side of the center gear drive assembly by a second drive shaft. Each of the first and second drive shafts typically has a driveline coupler at each end that allows the shafts to be quickly and easily pulled apart and put back together to facilitate field maintenance and/or towing from field to field.

A conventional driveline coupler used by many sprinkler manufacturers is provided by Universal Motion Components, Co. ("UMC") of Costa Mesa, Calif. This conventional driveline coupler has a pair of yoke members secured to opposing ends of two shafts to be coupled together. The yoke members have generally U-shaped ends that mesh with each other in a manner similar to a conventional universal joint assembly. A rubber member having four arms that extend outwardly from a center section is placed between the yoke members. In operation, the rotational torque in the driveline is transmitted through the driveline coupler by the U-shaped ends of the yoke members engaging and being engaged by the arms of the rubber member, respectively.

The conventional driveline coupler described above is now widely used in the drive trains of sprinkler irrigation systems because it provides a flexible, convenient, and reliable system to couple and uncouple a drive shaft. However, this conventional driveline coupler tends to fail under very high loads and extreme duty torque conditions, resulting in downtime and increased maintenance cost of the sprinkler system. Thus, there is a need in the industry for an improved driveline coupler suitable for use in irrigation sprinkler systems and the like.

SUMMARY OF THE INVENTION

It is an object of the present invention to provide an improved driveline coupler that provides a more reliable, extreme duty connection for drive train components.

It is a further object of the present invention to provide an improved driveline coupler that is capable of transmitting a higher amount of torque than the conventional driveline coupler described above.

It is a still further object of the present invention to provide an improved driveline coupler that is economical to manufacture, efficient in use, capable of a long operating life, and particularly well suited for use in sprinkler irrigation systems.

According to a broad aspect of the present invention, a high torque driveline coupler is provided, comprising: a first yoke assembly having a first plurality of axially extending legs extending from a base portion; a second yoke assembly having a second plurality of axially extending legs extending from a base portion, the legs of the second yoke assembly being configured to intermesh with the legs of the first yoke assembly to transmit rotational torque through the coupler; a rubber member having a center portion and a plurality of arms extending radially outwardly from the center portion, the rubber member being configured to fit between the first and second yoke assemblies with the arms of the rubber member extending between the intermeshed legs of the yoke assemblies; and an alignment system for aligning the rubber member with the first yoke assembly. The alignment system comprises a first recess formed in the center portion of the rubber member and a first projection secured to the base portion of the first yoke assembly. The first projection is shaped to fit snugly within the first recess to keep the rubber member substantially aligned with the first yoke assembly.

According to another broad aspect of the present invention, a sprinkler irrigation system is provided, comprising: at least one support tower assembly for supporting an irrigation pipe above a field to be irrigated, the support tower assembly having a drive motor, at least one wheel assembly, and a drive connection for transferring rotational energy from the drive motor to the wheel assembly. The drive connection comprises a driveline coupler having first and second yoke assemblies with intermeshed pairs of legs, a floating member with radially extending arms positioned between the intermeshed legs, and an alignment system for aligning the floating member with the yoke assemblies. The alignment system comprises a first recess formed in a center portion of the floating member and a first projection extending from: the first yoke assembly toward the first recess, the first projection being shaped to fit snugly within the first recess.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 1 is a perspective view of the support tower assemblies for supporting an irrigation pipe of a sprinkler irrigation system according to the present invention.

FIG. 2 is a detail view of a portion of the sprinkler irrigation system of FIG. 1 showing a high torque driveline coupler according to the present invention.

DETAILED DESCRIPTION OF THE PREFERRED EMBODIMENT

Figure 3:
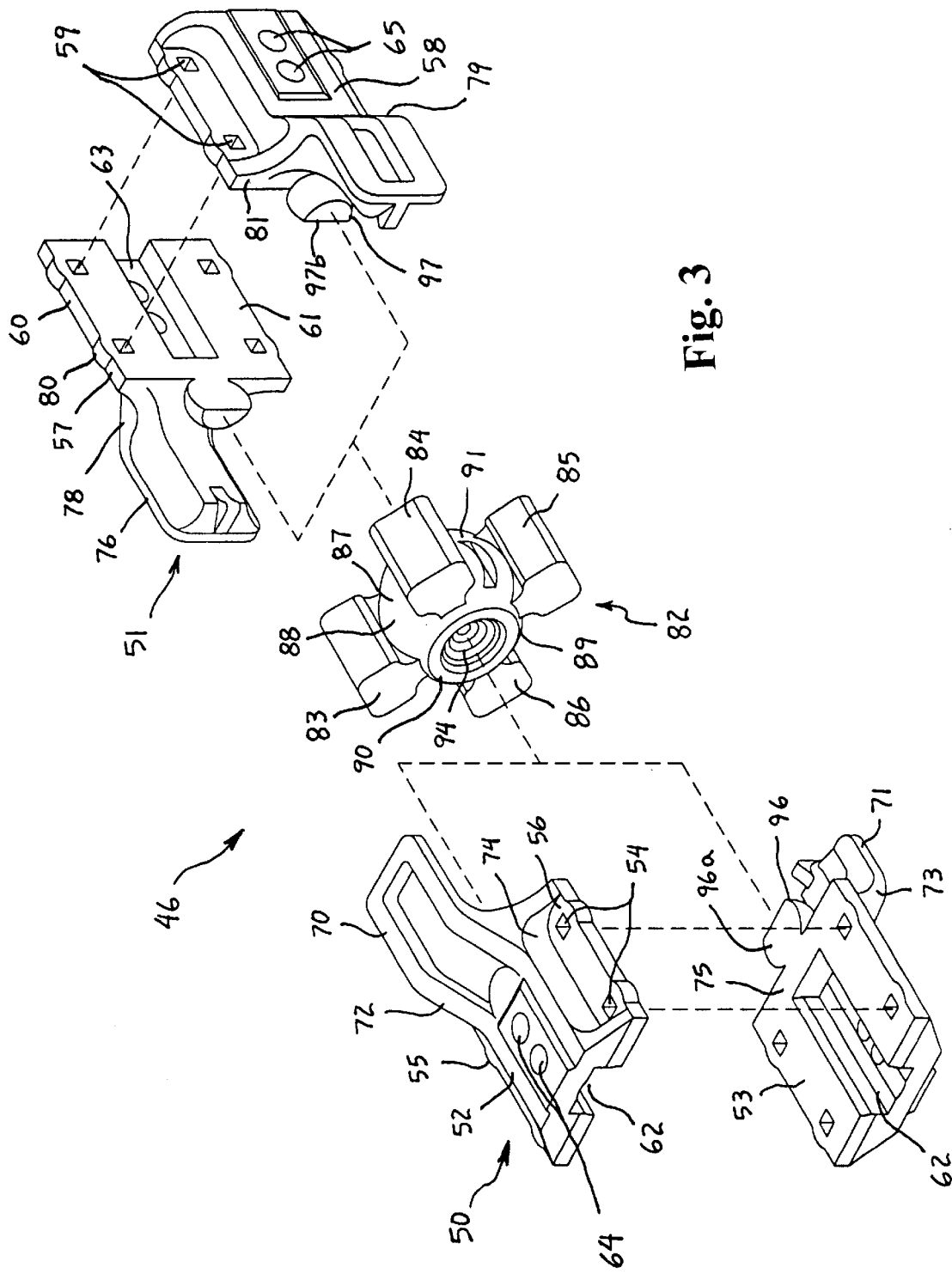
FIG. 3 is an exploded perspective view of a high torque driveline coupler according to a preferred embodiment of the present invention.

A sprinkler irrigation system 10 having an improved high torque driveline coupler 46 according to the present invention will now be described with reference to FIGS. 1 to 6 of the accompanying drawings.

The sprinkler irrigation system 10 has a plurality of support tower assemblies 12 that support an irrigation pipe or boom 14 above a field to be irrigated. The irrigation boom or pipe 14 is in the form of an elongated tubular pipe having a plurality of discharge openings spaced along a length thereof. The support tower assemblies 12 have generally A-shaped constructions formed by a pair of downwardly diverging frame members 20 and 22, which extend both forwardly and rearwardly from the pipe 14, as shown in FIG. 1. The lower ends of the members 20 and 22 are each connected to a horizontally disposed tubular frame member 26, as by welding or the like. The upper ends of the members 20 and 22 are secured to the pipe 14 by suitable bracket structures generally designated by the numeral 30. Each of the support tower assemblies 12 has a control system (not shown) having a power cable (not shown) extending therefrom for operating an electric drive motor 36. The drive motor 36 has a gearbox 37 associated therewith for providing a suitable gear reduction and for outputting rotational energy to front and rear drive shafts 38, 39.

The improvement provided by the present invention is directed toward the drive connection between the output of the center gearbox 37 associated with the drive motor 36, and a pair of supporting wheel assemblies 42, 44, which are located at the opposite ends of the support frame member 26. More specifically, the present invention is directed to improvements in the driveline couplers 46 used to connect each end of the drive shafts 38, 39 to the output shafts of the gear box 37 and the respective input shafts of the final drive gearboxes associated with the wheel assemblies 42, 44. The driveline coupler 46 is hidden from view in FIG. 1 by a conventional plastic safety shield S that slides over the coupler 46 during use.

The drive shafts 38, 39 each have respective driveline couplers 46 that allow the drive shafts 38, 39 to be quickly and easily engaged with and disengaged from the center gearbox 37 and the final drive gearboxes associated with the wheel assemblies 42, 44 to facilitate field maintenance and/or towing from field to field. Each driveline coupler 46 has a pair of yoke assemblies 50, 51 secured to opposing ends of the two shafts to be coupled together. The first yoke assembly 50 has first and second yoke members 52, 53 adapted to be clamped together by threaded fasteners extending through the openings 54 in the side flanges 55, 56. The second yoke assembly 51 has first and second yoke members 57, 58 adapted to be clamped together by threaded fasteners extending through the openings 59 in the side flanges 60, 61 in a manner similar to the first yoke assembly 50.

A recess 62, 63 is provided in each yoke member 52, 53, 57, 58, which is shaped and sized to generally surround one side of the shaft on which the yoke assembly 50, 51 is secured. Thus, when the first and second yoke members 52, 53, 57, 58 are placed on either side of the shaft with the shaft end positioned within the recesses 62, 63, the yoke assembly 50, 51 can be clamped tightly to the shaft by the threaded fasteners. Additional threaded fasteners or pins can also be passed through respective bores 64, 65 in the yoke members 52, 53, 57, 58 and bores in the shaft ends to further secure the yoke assemblies 50, 51 to the shafts.

Once the yoke assemblies 50, 51 are secured to the shafts, they each have a generally U-shaped configuration with the open side of the U-shape facing axially away from the shaft on which the yoke assembly 50, 51 is secured. The U-shaped configuration of the first yoke assembly 50 is defined by first and second legs 70, 71 that extend axially away from respective offset portions 72, 73 connecting the legs 70, 71 to the base portions 74, 75 of the yoke members 52, 53. Similarly, the U-shaped configuration of the second yoke assembly 51 is defined by first and second legs 76, 77 that extend axially away from respective offset portions 78, 79 connecting the legs 76, 77 to the base portions 80, 81 of the yoke members 57, 58. The yoke assemblies 50, 51 on two opposing shaft ends are coupled together by rotating one of the shafts approximately 90 degrees relative to the other shaft and moving the yoke assemblies 50, 51 toward one another until the legs 70, 71 of one yoke assembly 50 are intermeshed with the legs 76, 77 of the other yoke assembly 51. When the yoke assemblies 50, 51 are coupled together, the intermeshed legs 70, 71, 76, 77 function to transmit rotational torque through the driveline coupler 46.

A floating rubber insert member 82 having four generally clover-shaped arms 83, 84, 85, 86 that extend outwardly from a center section 87 is placed between the yoke assemblies 50, 51. The rubber member 82 is shaped to receive the first and second legs 70, 71 of the first yoke assembly 50 on first and second diametrically opposite sides 88, 89 of the center section 87 between the respective arms 83, 84 and 85, 86. The rubber member 82 is also shaped to receive the first and second legs 76, 77 of the second yoke assembly 51 on third and fourth diametrically opposite sides 90, 91 of the center section 87 between the respective arms 84, 85 and 86, 83. When the coupler 46 is fully assembled and the yoke assemblies 50, 51 are coupled together, the four arms 83, 84, 85, 86 of the rubber member 82 are positioned respectively between the four legs 70, 71, 76, 77 of the coupled yoke assemblies 50, 51. Thus, the rotational torque in the driveline is transmitted through the coupler 46 by the four legs 70, 71, 76, 77 of the coupled yoke assemblies 50, 51 engaging and being engaged by the four arms 83, 84, 85, 86 of the rubber member 82.

The coupler 46 of the present invention further includes an alignment system that aligns the rubber member 82 with the respective yoke assemblies 50, 51 located on each side of the rubber member 82. The alignment system comprises first and second recesses 94, 95 formed in each side of the rubber member 82, and corresponding projections 96, 97 extending from each of the yoke assemblies 50, 51. The projections 96, 97 are received snugly in the recesses 94, 95 and function to maintain the yoke assemblies 50, 51 and the rubber member 82 in precise alignment with each other. The recesses 94, 95 and projections 96, 97 are rounded to allow the projections 96, 97 to self-align and swivel within the recesses 94, 95 during operation.

Figure 4:
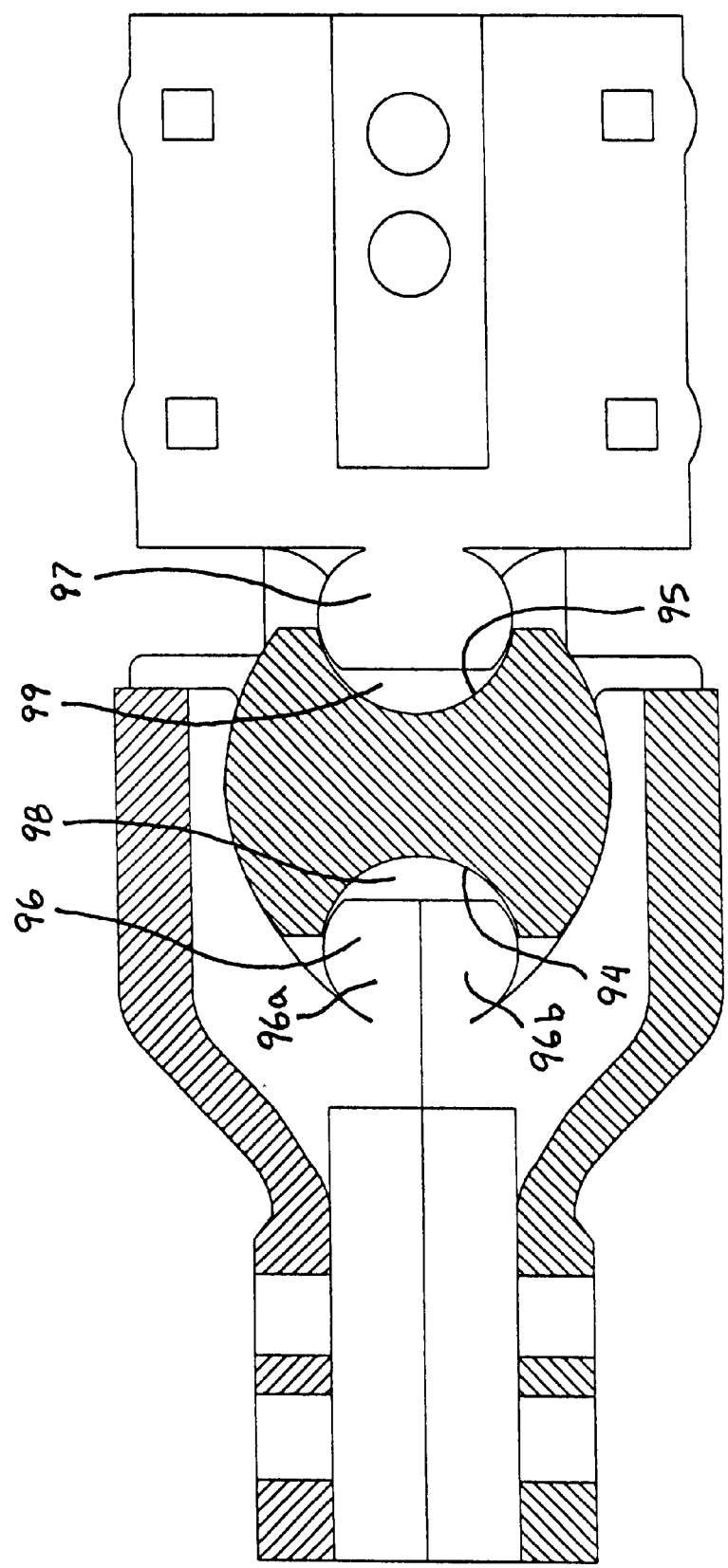
FIG. 4 is a sectional side view of the high torque driveline coupler according to the preferred embodiment of the present invention.

In the preferred embodiment, the recesses 94, 95 form a generally semispherical concavity, and the projections 96, 97 have a corresponding generally spherical shape. The recesses 94, 95 are centered on each side of the rubber member 82. The projections 96, 97 extend from the respective base portions 74, 75, 80, 81 of the yoke members 52, 53, 57, 58 and are centered about a longitudinal axis of the respective shafts on which the yoke assemblies 50, 51 are secured. As shown in FIGS. 3 and 4 of the drawings, the projections 96, 97 are formed integral with the base portions 74, 75, 80, 81 of the yoke assemblies 50, 51, with a first half 96a, 97a of each projection 96, 97 being formed on the first yoke members 52, 57 and a second half 96b, 97b of each projection being formed on the second yoke members 53, 58. When the yoke members 52, 53, 57, 58 are clamped together by fasteners extending through the holes 54, 59, the projection halves 96a, 96b and 97a, 97b fit together to form a generally spherical shape. The leading faces 96c, 97c of the projections 96, 97 in the preferred embodiment are flattened to facilitate a better fit of the outer peripheries of the projections 96, 97 within the recesses 94, 95 and to provide spaces 98, 99 for debris to accumulate in severe operating conditions without affecting the alignment of the projections 96, 97 within the recesses 94, 95.

Figure 5:
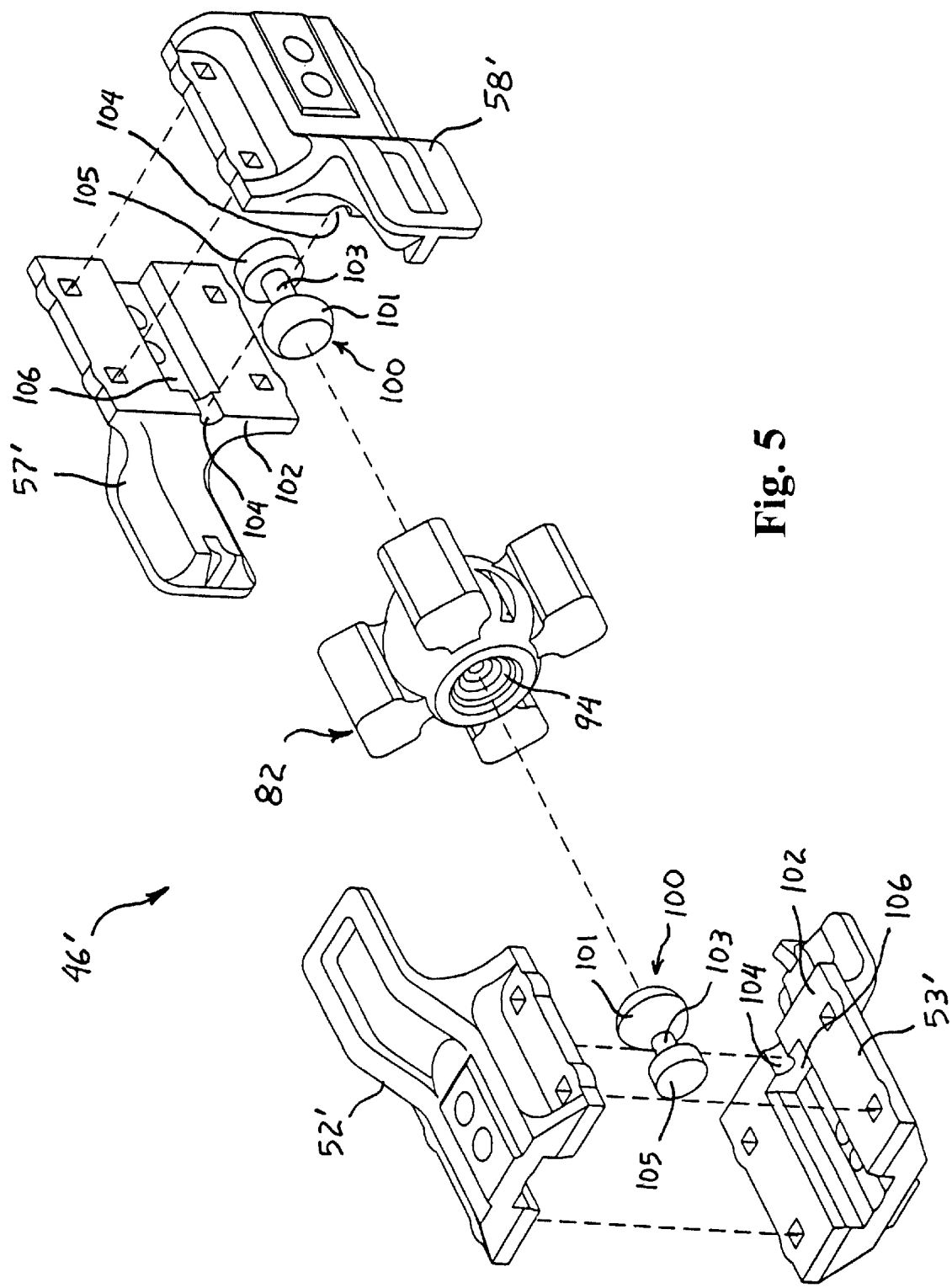
FIG. 5 is an exploded perspective view of a high torque driveline coupler according to another embodiment of the present invention.
Figure 6:
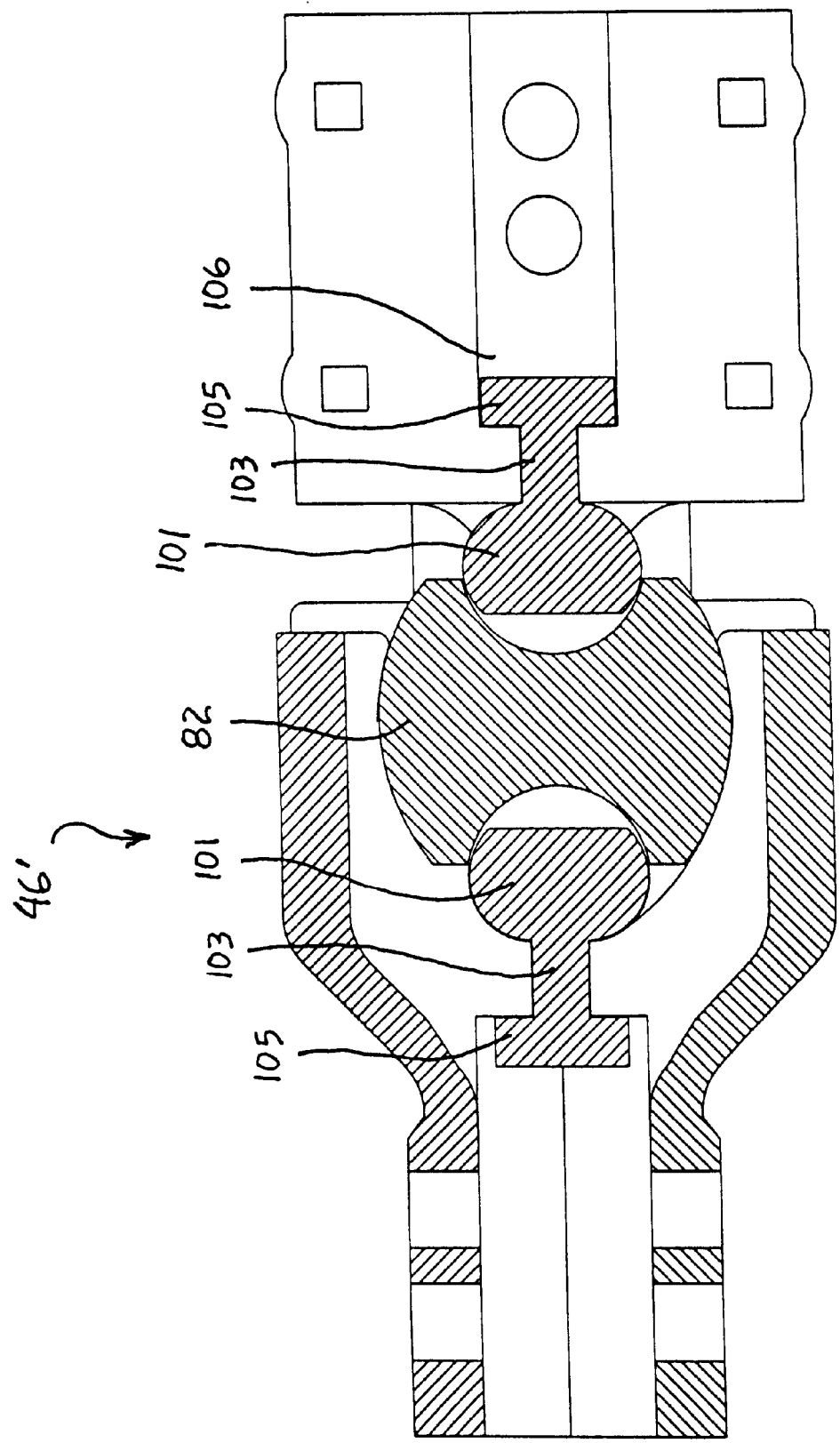
FIG. 6 is a sectional side view of the high torque driveline coupler shown in FIG. 5.

A high torque driveline coupler 46' according to an alternative embodiment is shown in FIGS. 5 and 6. In the alternative embodiment, the projection 100 of the alignment system is formed as a separate component from the yoke members 52', 53', 57', 58'. The projection 100 is provided with a rounded body member 101 having generally the same outer shape as the projections 96, 97 shown in FIGS. 3 and 4. However, instead of being integrally formed with the base portion 102 of the yoke members 52', 53', 57', 58', the projection 100 has a neck portion 103 that fits into grooves 104 formed in the opposing faces of the yoke members 52', 53'57', 58', and a flat head portion 105 that fits into an end of the recess 106 in which the drive shaft or gearbox shaft is received. Thus, the projection 100 in this alternative embodiment is a separate component clamped between the yoke members 52', 53', 57', 58' in alignment with the longitudinal axis of the shaft on which the coupler is mounted.

The alignment system of the present invention provides a dramatic improvement in the strength of the couplers 46, 46', allowing substantially higher loads to be transmitted through the coupler. The legs 70, 71, 76, 77 of the yoke members and the arms 83, 84, 85, 86 of the rubber member 82 are kept in alignment with each other by the projections 96, 97, 100 received in the recesses 94, 95. As a result, the yoke members 52, 53, 57, 58 and 52', 53', 57', 58' are prevented from becoming off center, which typically happens with conventional driveline couplers just before they fail.

A prototype of the coupler 46' according to the second embodiment described above was tested to determine the amount of torque that can be transmitted through the coupler before it fails. A conventional coupler having the same structure, except without the alignment system of the present invention, was also tested. These tests indicated that the improved coupler with the alignment system of the present invention can transmit up to 64% more torque before it fails than the conventional coupler without the alignment system.

It will be appreciated that the present invention is not limited to the exact constructions that have been described above and illustrated in the accompanying drawings, and that various modifications and changes can be made without departing from the scope and spirit of the invention. It is intended that the scope of the invention be limited only by the appended claims.

What is claimed is:

1. A sprinkler irrigation system comprising:
   at least one support tower assembly for supporting an irrigation pipe above a field to be irrigated, said support tower assembly having a drive motor, at least one wheel assembly, and a drive connection for transferring rotational energy from said drive motor to said wheel assembly;
   said drive connection comprising a high torque driveline coupler, comprising:
      a first yoke assembly having a first plurality of axially extending legs extending from a base portion;
      a second yoke assembly having a second plurality of axially extending legs extending from a base portion, the legs of said second yoke assembly being configured to intermesh with the legs of said first yoke assembly to transmit rotational torque through the coupler;
      an insert member having a center portion and a plurality of arms extending radially outwardly from the center portion, the insert member being configured to fit between the first and second yoke assemblies with the arms of the insert member extending between the intermeshed legs of the yoke assemblies; and
      an alignment system for aligning the insert member with the first yoke assembly, said alignment system comprising a first projection having a round cross section which is concentric with a longitudinal axis of said first yoke assembly and extends along said longitudinal axis from said first yoke assembly into a center portion of the insert member.

2. The sprinkler irrigation system as set forth in claim 1, wherein said alignment system comprises a first recess formed in the center portion of the insert member and said first projection is secured to the base portion of the first yoke assembly, said first projection being shaped to fit snugly within said first recess, and a second recess formed in the center portion of the insert member on an opposite side from said first recess, and a second projection secured to the base portion of the second yoke assembly, said second projection being shaped to fit snugly within said second recess, whereby said insert member is kept in alignment with said first and second yoke assemblies.

3. The sprinkler irrigation system as set forth in claim 2, wherein said first and second recesses are semispherical shaped.

4. The sprinkler irrigation system as set forth in claim 2, wherein said first and second projections have rounded portions that fit snugly within said first and second recesses, respectively.

5. The sprinkler irrigation system as set forth in claim 4, wherein said first and second projections each have a flat leading face that cooperates with a shape of the respective first and second recesses to provide a space for debris to accumulate without affecting the alignment of the projections within the recesses.

6. The sprinkler irrigation system as set forth in claim 1, wherein said first yoke assembly comprises first and second yoke members that are secured together at said base portion, and said first plurality of legs comprises first and second legs that extend axially from said first and second yoke members, respectively, to form a generally U-shaped configuration with an open side of the U-shape facing away from said base portion.

7. The sprinkler irrigation system as set forth in claim 6, wherein said first projection comprises a first projection portion formed integrally with said first yoke member and a second projection portion formed integrally with said second yoke member, said first and second projection portions cooperating with each other to form said first projection when said first and second yoke members are secured together.

8. The sprinkler irrigation system as set forth in claim 1, wherein said first plurality of axially extending legs comprises a first pair of axially extending legs, and said second plurality of axially extending legs comprises a second pair of axially extending legs which intermesh with the first pair of axially extending legs, and said insert member has four arms that extend between the first and second pairs of legs of the yoke assemblies.

9. The sprinkler irrigation system as set forth in claim 8, wherein said first and second yoke assemblies can be coupled together with said insert member therebetween by moving the yoke assemblies toward one another in an axial direction until the legs of the yoke assemblies are intermeshed with the arms of the insert member therebetween, and wherein said first and second yoke assemblies can be uncoupled by merely moving the yoke assemblies away from one another in an axial direction.

10. A sprinkler irrigation system comprising:
   at least one support tower assembly for supporting an irrigation pipe above a field to be irrigated, said support tower assembly having a drive motor, at least one wheel assembly, and a drive connection for transferring rotational energy from said drive motor to said wheel assembly;
   said drive connection comprising a high torque driveline coupler, comprising:
      a first yoke assembly having a first plurality of axially extending legs extending from a base portion;
      a second yoke assembly having a second plurality of axially extending legs extending from a base portion, the legs of said second yoke assembly being configured to intermesh with the legs of said first yoke assembly to transmit rotational torque through the coupler;
      an insert member having a center portion and a plurality of arms extending radially outwardly from the center portion, the insert member being configured to fit between the first and second yoke assemblies with the arms of the insert member extending between the intermeshed legs of the yoke assemblies; and
      an alignment system for aligning the insert member with the first yoke assembly, said alignment system comprising a structure extending along an axis of rotation of said coupler between a center portion of the insert member and said first yoke assembly;
      wherein said alignment system comprises a generally semispherical shaped recess formed in said insert member.

11. The sprinkler irrigation system as set forth in claim 10 wherein said alignment system further comprises a first projection extending from said first yoke assembly and having a rounded portion that fits snugly within said first recess when said first yoke assembly is aligned with said insert member.

12. The sprinkler irrigation system as set forth in claim 11, wherein said first projection has a flat leading face that cooperates with the semispherical shape of the first recess to provide a space for debris to accumulate without affecting the alignment of the first projection within the first recess.

13. A sprinkler irrigation system comprising:
   at least one support tower assembly for supporting an irrigation pipe above a field to be irrigated, said support tower assembly having a drive motor, at least one wheel assembly, and a drive connection for transferring rotational energy from said drive motor to said wheel assembly;
   said drive connection comprising a high torque driveline coupler, comprising:
      a first yoke assembly having a first plurality of axially extending legs extending from a base portion;
      a second yoke assembly having a second plurality of axially extending legs extending from a base portion, the legs of said second yoke assembly being configured to intermesh with the legs of said first yoke assembly to transmit rotational torque through the coupler;
      an insert member having a center portion and a plurality of arms extending radially outwardly from the center portion, the insert member being configured to fit between the first and second yoke assemblies with the arms of the insert member extending between the intermeshed legs of the yoke assemblies; and
      an alignment system for aligning the insert member with the first yoke assembly, said alignment system comprising a first projection which is concentric with and extends along an axis of rotation of said coupler between a center portion of the insert member and said first yoke assembly;
   wherein said first yoke assembly comprises first and second yoke members that are secured together at said base portion, and said first plurality of legs comprises first and second legs that extend axially from said first and second yoke members, respectively, to form a generally U-shaped configuration with an open side of the U-shape facing away from said base portion;
   wherein said first projection is a separate component clamped between the first and second yoke members, said first projection having a rounded body member extending firm said base portion between said first and second legs.

14. The sprinkler irrigation system as set forth in claim 13, wherein said first projection has a neck portion extending from said rounded body member and a head portion connected to an end of said neck portion opposite from said rounded body member, and wherein said first and second yoke members have respective recesses formed therein that accommodate said head portion and said neck portion when said first and second yoke members are secured together.

15. A sprinkler irrigation system comprising:
   at least one support tower assembly for supporting an irrigation pipe above a field to be irrigated, said support tower assembly having a drive motor, at least one wheel assembly, and a drive connection for transferring rotational energy from said drive motor to said wheel assembly;
   said drive connection comprising a driveline coupler, said coupler having first and second yoke assemblies with intermeshed pairs of legs, a floating member with radially extending arms positioned between the intermeshed legs, and an alignment system for aligning the floating member with the yoke assemblies, said alignment system comprising a first projection having a round cross section which is concentric with a longitudinal axis of said coupler and extends along said longitudinal axis from at least one of said first and second yoke assemblies into a center portion of said floating member.

16. The sprinkler irrigation system according to claim 15, wherein said floating member is made of rubber.

17. The sprinkler irrigation system according to claim 15, wherein said alignment system comprises a first recess formed in the center portion of said floating member and said first projection extending from said first yoke assembly toward said first recess, said first projection being fit within said first recess, and a second recess formed in the center portion of said floating member on an opposite side from said first recess, and a second projection extending from said second yoke assembly toward said second recess, said second projection being fit within said second recess.

18. The sprinkler irrigation system according to claim 17, wherein said first and second recesses are generally semispherical shaped, and said first and second projections have rounded portions that fit snugly within said first and second recesses, respectively.

19. The sprinkler irrigation system according to claim 15, wherein said first and second yoke assemblies are coupled together with said floating member therebetween by moving the yoke assemblies toward one another in an axial direction until the legs of the yoke assemblies are intermeshed with the arms of the floating member therebetween, and wherein said first and second yoke assemblies are uncoupled by merely moving the yoke assemblies away from one another in an axial direction.

20. A sprinkler irrigation system comprising:
at least one support tower assembly for supporting an irrigation pipe above a field to be irrigated, said support tower assembly having a drive motor, at least one wheel assembly, and a drive connection for transferring rotational energy from said drive motor to said wheel assembly;
said drive connection comprising a driveline coupler, comprising:
first and second yoke assemblies, each yoke assembly having a base portion adapted to be connected to a drive shaft and a pair of legs extending from said base portion, said legs together defining a generally U-shaped configuration with an open side of the U-shape facing axially away from the base portion;
a floating member having a center portion and a plurality of arms extending radially from said center portion; and
an alignment system for positioning said floating member between said first and second yoke assemblies with said arms of said floating member intermeshed between said legs of said yoke assemblies, said alignment system having a first recess formed in the center portion of said floating member concentric with an axis of rotation thereof, and a first projection having a round cross section extending from said first yoke assembly toward said first recess, said first projection being concentric with a longitudinal axis of said first yoke assembly and being fit within said first recess when said yoke assemblies and said floating member are coupled together.

21. A sprinkler irrigation system comprising:
at least one support tower assembly for supporting an irrigation pipe above a field to be irrigated, said support tower assembly having a drive motor, at least one wheel assembly, and a drive connection for transferring rotational energy from said drive motor to said wheel assembly;
said drive connection comprising a high torque driveline coupler, comprising:
a first yoke assembly having a first plurality of axially extending legs extending from a base portion;
a second yoke assembly having a second plurality of axially extending legs extending from a base portion, the legs of said second yoke assembly being configured to intermesh with the legs of said first yoke assembly to transmit rotational torque through the coupler;
an insert member having a center portion and a plurality of arms extending radially outwardly from the center portion, the insert member being configured to fit between the first and second yoke assemblies with the arms of the insert member extending between the intermeshed legs of the yoke assemblies; and
an alignment system for aligning the insert member with the first yoke assembly, said alignment system comprising a first projection which is a separate component from the first yoke assembly and the insert member and which is concentric with a longitudinal axis of said coupler and extends along said longitudinal axis from said first yoke assembly into a center portion of the insert member.

\* \* \* \* \*